United States Patent [19]
Jones

[11] 3,884,508
[45] May 20, 1975

[54] PIPE COUPLINGS

[76] Inventor: Eugene G. Jones, 2637 N. Johnson St., New Orleans, La. 70117

[22] Filed: Dec. 10, 1973

[21] Appl. No.: 424,347

[52] U.S. Cl. ............... 285/31; 285/27; 285/39; 285/302; 285/310; 285/320; 285/340; 285/DIG. 3
[51] Int. Cl. ............................. F16l 37/08
[58] Field of Search .......... 285/DIG. 3, 317, 27, 31, 285/39, 320, 302, 310, 340; 248/410, 354 C; 403/377, 365, 367, 368, 327

[56] References Cited
UNITED STATES PATENTS

| | | | |
|---|---|---|---|
| 666,316 | 1/1901 | Kenneally | 285/31 |
| 1,203,071 | 10/1916 | Straub | 403/365 |
| 1,674,081 | 6/1928 | Adams | 248/410 |
| 2,268,456 | 12/1941 | Meyer | 285/317 |
| 2,521,127 | 9/1950 | Price | 285/302 |
| 2,681,807 | 6/1954 | Krafft | 285/DIG. 3 |
| 2,912,260 | 11/1959 | Wray | 285/317 X |
| 3,406,990 | 10/1968 | Brennan | 285/310 |
| 3,475,038 | 10/1969 | Matherne | 285/27 |
| 3,588,023 | 6/1971 | Cohen | 248/410 |
| 3,680,893 | 8/1972 | Giraud | 285/39 |

FOREIGN PATENTS OR APPLICATIONS

| | | | |
|---|---|---|---|
| 717,875 | 9/1965 | Canada | 285/DIG. 3 |
| 284,564 | 2/1928 | United Kingdom | 285/DIG. 3 |

*Primary Examiner*—Thomas F. Callaghan
*Attorney, Agent, or Firm*—Warren N. Low; Richard P. Matthews

[57] ABSTRACT

A releasable connector for various conduits utilizing a canted locking ring and is provided with canting means in the form of a projection from the locking ring having an aligning finger and intermediate abutting shoulder. A releasable pin assembly is incorporated with a boss or groove on the outside of the housing of the connector to permit release of the locking ring from the conduit.

A jamming screw may be used to add additional pressure to cant the locking ring for holding a conduit.

The releasable connector may be extensible by use of telescopic parts to repair various lengths of pipe.

A funnel shaped skirt may be secured to the releasable connector to guide the connector to cap wild wells.

17 Claims, 15 Drawing Figures

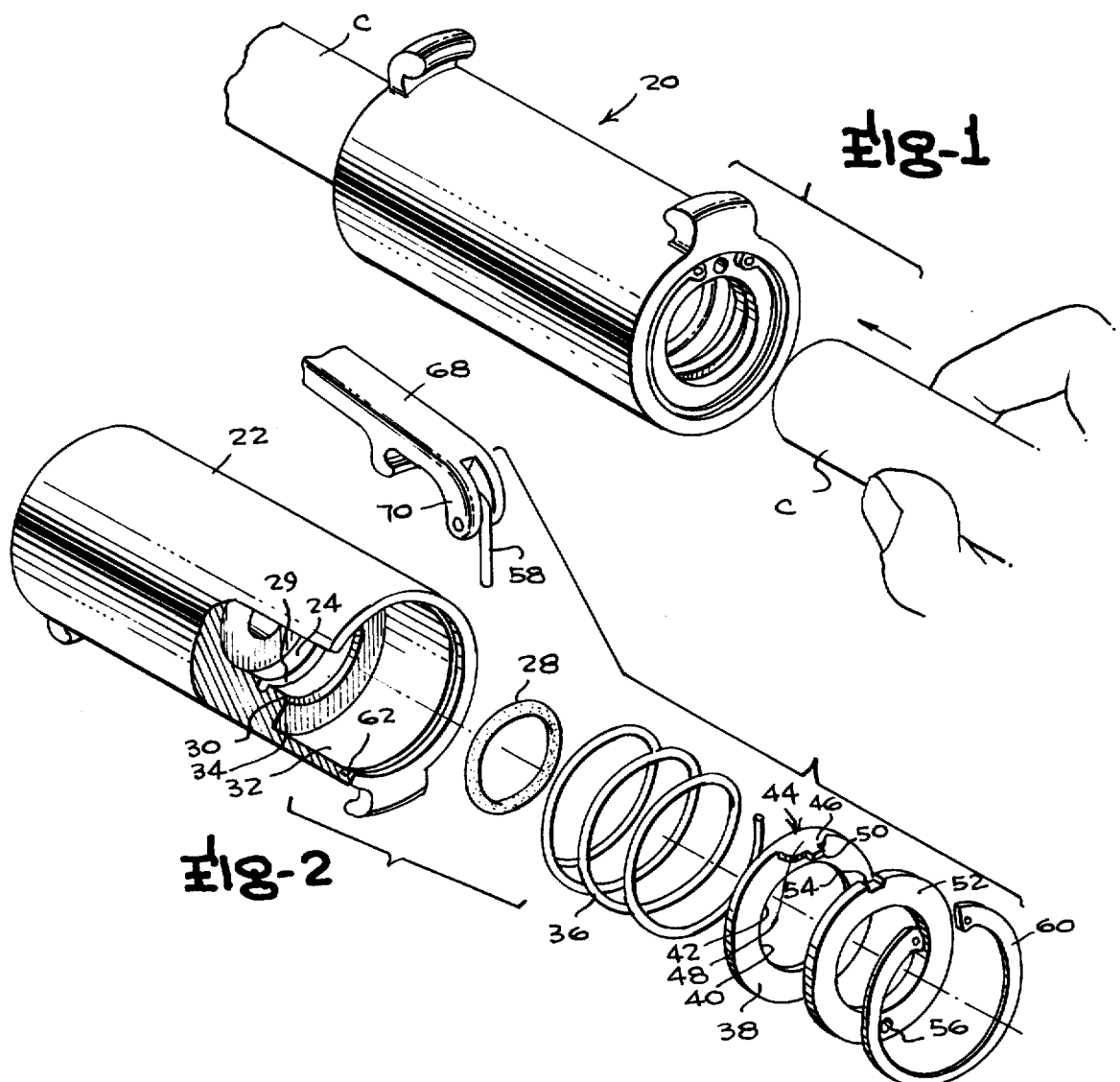
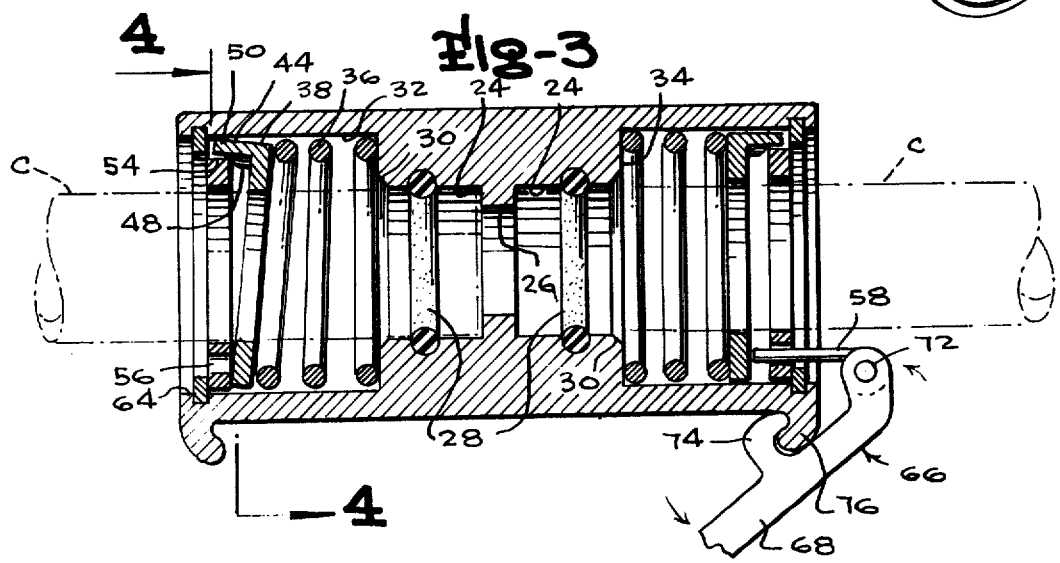

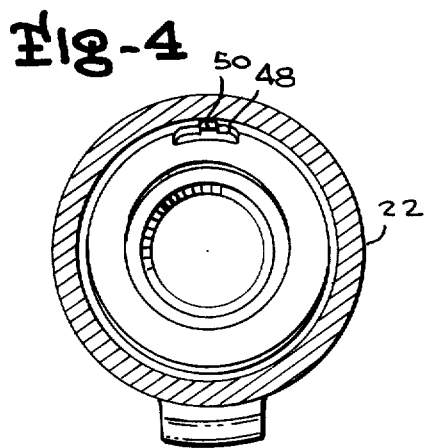
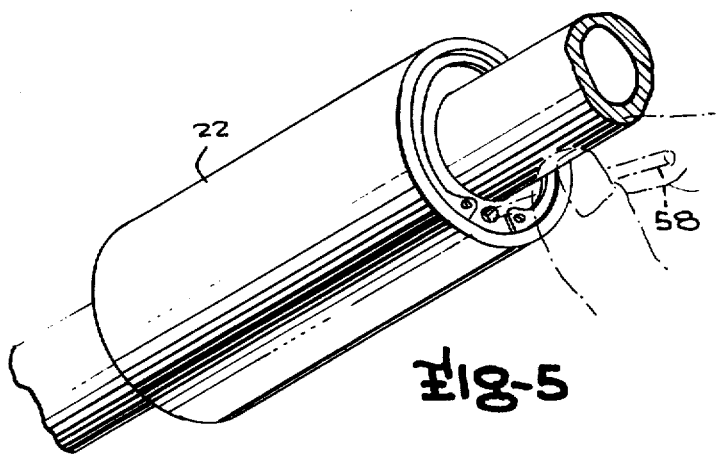
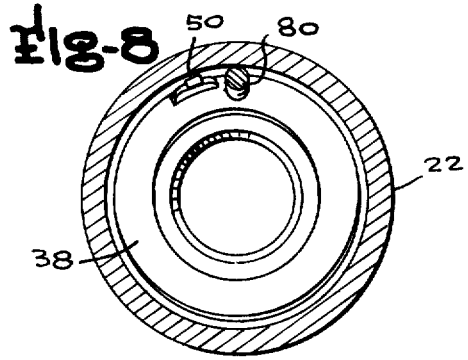
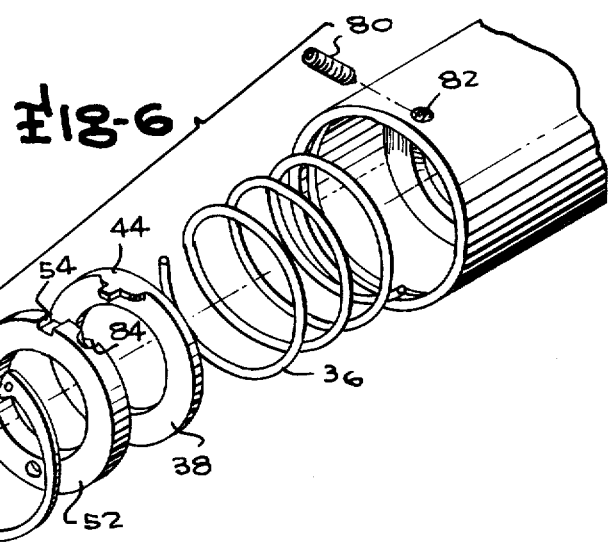
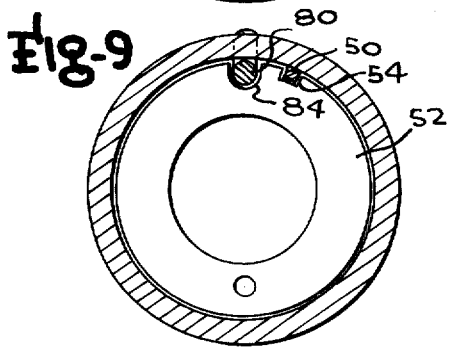
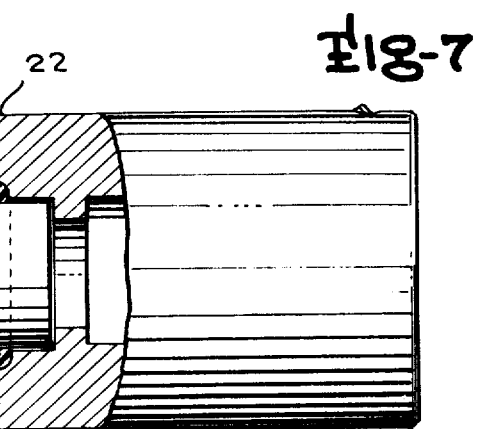

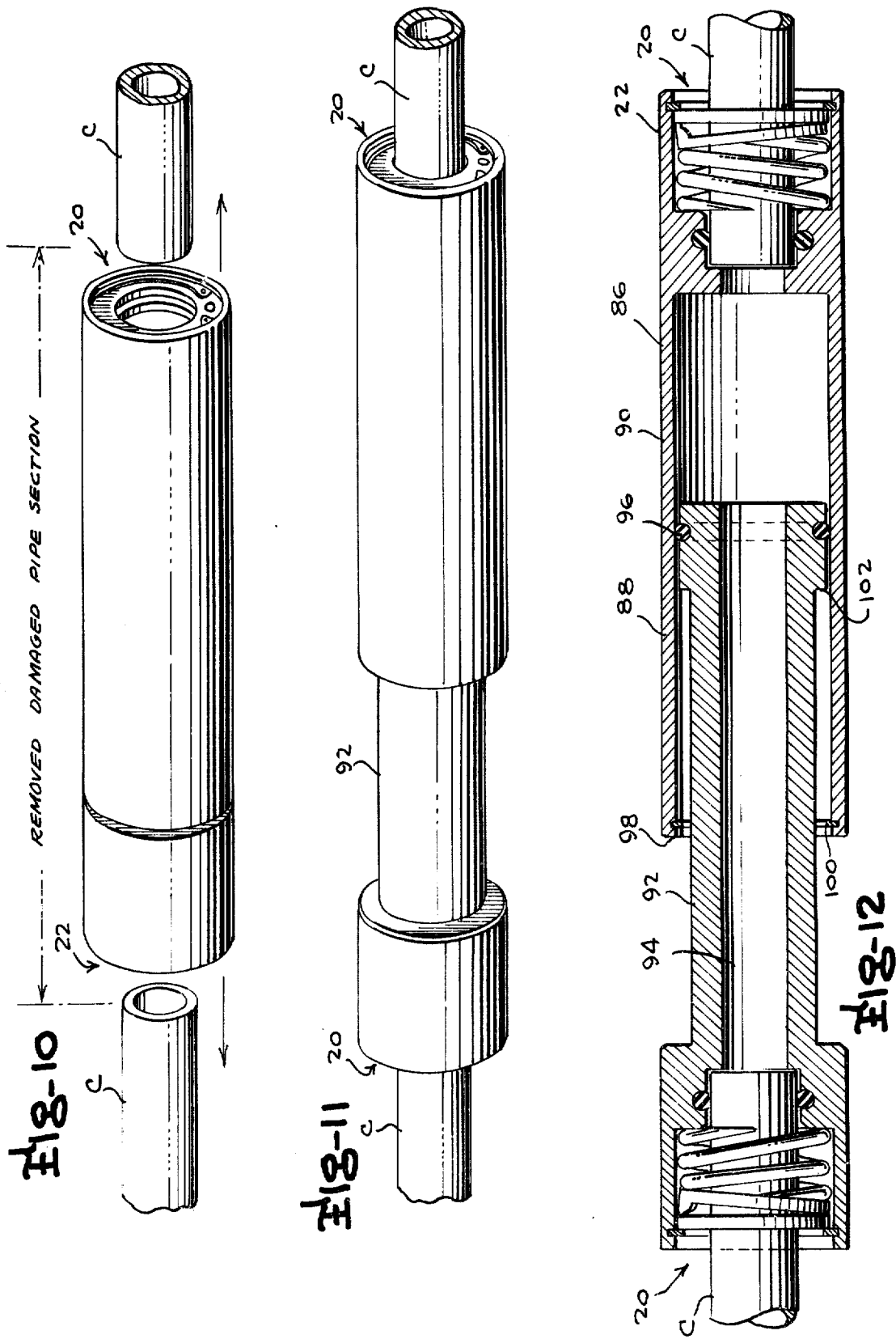

PIPE COUPLINGS

BACKGROUND OF THE INVENTION

Pipe and tubing connectors have been known and used in a variety of forms and constructions each of which possesses some particular advantages for a selected use. Releasable connectors must have various characteristics to be suitable for the purposes intended, but the principal characteristic is that the coupling must be easily connected and quickly released when desired. Additionally, such couplings must be capable of withstanding substantial internal pressures which would tend to bring about the failure of the connector by either leakage of the fluids in the conduit or simply that the connector would be forced off the conduit for a total failure.

Many prior art releasable connectors in order to effect releasibility suffered from the disadvantage that the hold on the conduit was not sufficiently strong to withstand the pressures of this engagement. Efforts to strengthen the hold of the connector upon the conduit generally would reduce the ease of releasability of the connector. It has been found therefore, that either the hold of the prior art connectors on the conduit or the ease of releasability would suffer and would not meet acceptable standards.

Other connectors have been used for quick patching purposes in the event that there is for instance, damage to a particular portion of a conduit such as an oil or gas pipeline for which a rapid repair is eesential to minimize pollution and safety hazards. Such a repair must be accomplished with a minimum of interruption of the flow to be amongst Prior art approaches have included amonst other possibilities the cutting out of the damaged portion and welding or otherwise securing to the facing ends of the conduit a suitable sleeve. The time loss for the interruption of the flow is considerable and has been undesirable to effect the securing of the sleeve to the facing ends of the conduit.

The capping of wild oil or gas wells for instance, has posed particular problems in designing a suitable connector. It is essential for any such connector to be guided into position over the wild well while it is spouting its fluid usually at great velocity. Not only must the connector be capable of quickly engaging and holding the pipeline against the great force of disengagement, but the alignment of the connector to the well head is obviously essential before any connection can be made. Prior art guidance techniques and apparatus were not wholly satisfactory to meet the requirements for aligning the connector to the pipeline.

OBJECTS OF THE INVENTION

It is the principal object of the present invention to provide a releasable connector that is simple to operate and which holds in place on a conduit even under high pressure and which is capable of quickly releasing.

It is also an object of the present invention to provide a releasable connector for a conduit that is simple and economical to fabricate and sufficiently durable to withstand high pressures encountered in various conduits.

A further object of the present invention is to provide for a combination in releasing tool assembly which permits the quick release of the connector on the conduit.

It is also an object of the present invention to provide for the application of additional force to the holding means in a releasable connector that enables the connector to withstand the highest internal pressures without unexpected disengagement.

A further object of the present invention is the provision of a releasable connector for use as a substitute for a portion of a damaged conduit.

This invention also has as an object the provision of a releasable connector that is extensible and capable of substituting for various lengths of a damaged conduit.

This invention also has as a further object the provision of a releasable connector that may be readily and easily guided into capping position over a conduit that may have uncontrolled fluid gushing forth such as oil or gas well pipeline.

Another object of the present invention is a provision of a guidance means secured to the releasable connector that will aid in the alignment of the releasable connector to the conduit.

These and other objects of the present invention may be already apparent upon careful perusal of the following specification and drawings.

DESCRIPTION OF THE DRAWINGS

FIG. 1 is a perspective view of the releasable connector of the present invention illustrating the method of insertion of the coupling.

FIG. 2 is an exploded view partly broken away of the releasable coupling of the present invention including the releasing tool assembly.

FIG. 3 is a cross-sectional view of the releasable connector illustrating the position of the interior structure during holding of the conduit and the operation of the releasing tool assembly to permit disengagement of the conduit from the connector.

FIG. 4 is a cross-sectional view taking along the lines 4—4 of FIG. 3.

FIG. 5 is a perspective view of another embodiment of the present invention.

FIG. 6 is an exploded perspective view partly broken away of the embodiment of FIG. 5 and illustrating the unique canting means and additional screw securing means.

FIG. 7 is a partly broken away cross-sectional view of the embodiment of FIG. 5 illustrating the action of the canting means and screw.

FIG. 8 is a cross-sectional view taken along the lines 8—8 of FIG. 7.

FIG. 9 is a cross-sectional view taken along the lines 9—9 of FIG. 7.

FIG. 10 is a perspective view of a further embodiment of the present invention illustrating the telescopic releasable connector in the telescoped position.

FIG. 11 is a perspective view of the telescopic releasable connector in the extended position.

FIG. 12 is a cross-sectional view of the telescopic releasable connector of the present invention.

DESCRIPTION OF THE INVENTION

Figure 13:
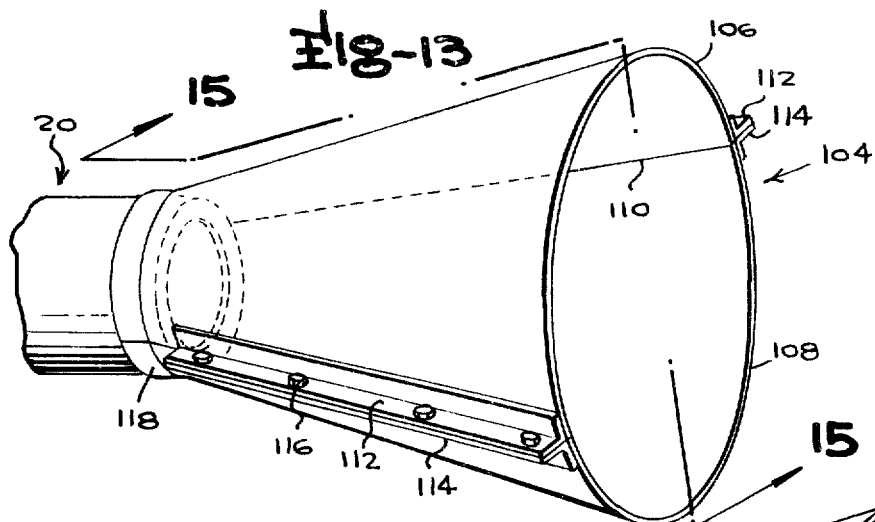
FIG. 13 is a perspective view partly broken away of another embodiment of the present invention illustrating the funnel means for guiding the releasable connector into position.

FIGS. 1 through 4 illustrate an important embodiment of the present invention wherein the releasable connector is shown generally at 20 and is formed of a housing 22 which is preferably of elongaged cylindrical shape. The internal configuration of the housing and the various working parts are identical on each end and the same identifying numerals will be used for identical or similar parts.

A central bore 24, adapted to receive the conduits C,C to be held, includes a stop limit 26 for the conduit and sealing means such as O-ring 28 embedded in a suitable groove 29 in the central bore 24 to effect a water tight seal with the conduit C. At the end of the central bore 24 is a bevelled edge 30 which aids in guiding the conduit into the proper position in the central bore 24.

Communicating with the central bore 25 is an enlarged bore or cavity 32 forming an abutting wall surface 34. The enlarged bore 32 is provided with a biasing means in the form of a strong coil spring 36 which is concentric to the enlarged bore and of an internal diameter that the conduit C may pass freely through the coil spring 36 to seat in the central bore 24. The force of the spring 36 being compressed acts upon the locking ring 38 which has a central aperture 40 of a diameter just slightly larger than the outside diameter of the conduit C. The conduit C then may be freely passed through the central aperture 40, when the locking ring 38 is axially aligned, without locking the conduit into releasable connector 20 when the locking ring 38 is canted so as to be axially nonaligned with the axis of the central conduit locking takes place.

In FIG. 3 on the right hand side of the drawing the position of the locking ring 38 is shown to be axially aligned and therefore permit free movement of the conduit C into a nonaligning engagement with the releasable connector 20. On the left hand side of the diagram of FIG. 3 there is illustrated the locking position in which the edges 42 of the central aperture 40 firmly grasps the conduit as it is canted. In the position or the left side of FIG. 3 the conduit C is securely held in the releasable connector.

In order to selectively hold and release the conduit C from the releasable connector, the locking ring 38 is canted to the nonaligned position to hold the conduit C and selectively aligned for release and disengagement. A canting means 44 is positioned on the side of the locking ring 38 opposite from the spring 36. The canting means 44 is formed by a projection 46 offset from the plane of the locking ring 38 and may project at an angle of approximately 60° to approximately 90° from the plane of the face of the ring 38. Positioned upon the projection 46 is at least one intermediate shoulder 47 provided for abutting contact. At the outer most extent of the projection 46 is an alignment finger 50 which is adapted to cooperate with an additional aligning means that will be here and after described.

As shown in FIGS. 2 and 3 particularly, the canting means 44 cooperates with a ring washer 52 that serves as an abutment for the locking ring 38. The ring washer 52 includes a slot 54 that upon proper alignment with the alignment finger 50 will receive the finger 50 as shown in FIG. 3. The intermediate shoulder 48 abuts upon the planar face of the ring washer 52 and as the spring 36 urges the locking ring 38 and the canting means upon gaining abutting contact with the locking ring 52 will move into the position illustrated in the left hand portion of FIG. 3 and grip the external surface of the conduit in a locking engagement. The ring washer 52 is provided with the release pin hole 56 that is diametrically opposed to the slot 54 in order to receive the release pin 58. The alignment finger 50 maintains the locking ring 38 in proper position for the most effective use of the release pin 58 as it passes through the release pin hole 56 to engage the locking ring as shown in the right hand portion of FIG. 3 and move it from the canted or locking position on the left hand side of FIG. 3 to the aligned or disengaging position on the right hand portion of FIG. 3 illustration. The ring washer 52 is held in position by any suitable means such as by the retaining ring 60 held in place in a complementary groove 62 adjacent the mouth 64 of the housing 22.

In order to effectively grasp and hold the conduit C under extremely high pressures that may be encountered within the conduit C and not have the releasable connector undesirably released, the coil spring 36 is preferably a heavy relatively stiff spring. Thus, when the locking ring 38 is in the canted or locking position it is difficult to insert a release pin 58 to push back the lower portion of the locking ring 38 from the canted position to the aligned position in the right hand portion of FIG. 3.

It is therefore, one of the important aspects of this embodiment of the present invention that the release pin 58 be activated by means of the release pin assembly 66.

As best shown in FIGS. 2 and 3 the release pin assembly includes a lever or handle 68 at one end and a bifurcated head 70 at the other end between which the release pin 58 is pivoted and suitably held by bearing pin 72. The underside of the lever handle 68 is provided with a hook or enlargement 74 that engages a boss 76 on the external surface of the housing 22 and adjacent the mouth 64. The shape of the boss 76 can be varied as it is only necessary to effect a securing engagement between the engaging part on the lever or handle 68 such as the hook 74 and the boss 76 to permit the lever action of the release pin assembly. It is possible that instead of the boss 76 projecting substantially radially outwardly from the housing 22 that a circumferential slot or groove such as particularly shown in FIGS. 14 and 15 at 78 would be suitable to grasp or receive the portion 74 to permit the insertion of the release pin 58 through the release pin hole 56 with considerably greater force than could be applied manually without the release pin assembly.

FIGS. 5 through 9 illustrate a further embodiment of the present invention which possesses many similar parts that will be identified with common numerals. The housing 22 may or may not incorporate the boss 76 or the groove or slot 78 to permit the operation of the release pin 58 that shown for purposes of illustration only in FIG. 5.

An important facet of the invention as illustrated in this embodiment is the jamming screw 80 which is received into a threaded hole 82 in the housing 22 and aligned in a manner as best shown in FIG. 7 to contact the upper portion of locking ring 38 to act as an additional canting means to that of the projection 44 positioned on the locking ring as previously described. It will also be noted that the ring washer 52 is identical to that previously described except for cut out portion 84 adjacent the slot 54 in the ring washer. This cut out portion 84 is adapted to receive the screw 80 on its inclined path through the hole 82 into contact with the locking ring 38. The cut out portion 84 on the ring washer 52 will also assure proper alignment though the principal purpose of the screw 80 is to provide the additional positive pressure upon the locking ring that will enable the releasable connector to be used on conduits carrying extremely high pressure fluids.

In FIGS. 10 through 12 a further embodiment of the present invention is described. In the event that a section of a conduit has been damaged and is to be removed, the remaining portions of the conduit are to be reconnected for flow of the fluid. To permit a simple and rapid connection, this embodiment of the present invention is designed to be adaptable to be used to substitute for variable lengths of the removed portion of damaged conduit.

As best shown in FIG. 12 the extensible or telescopic releasable connector is shown at 86 and is identical in those portions which grasp and release the conduit C as shown generally by the numerals 20. The boss 76 or the slot 78 may be incorporated on the exterior of the housing 22 if desired. The housing as shown in FIG. 12 is elongated at 88 forming a telescopic chamber 90 which receives elongated plunger 92 hollowed out at 94 to permit the flow of fluids between the opposed conduits C. At the head end of the plunger, suitable leak tight means is provided such as O-ring 96.

FIGS. 10 and 11 illustrate the telescopic releasable connector 86 in the closed or telescoped position in FIG. 10 and in the extended position in FIG. 11 to fit and grasp the ends of the respective conduits C.

The telescopic chamber 90 includes at its open end 98 stop means 100 to limit the extensible movement of the plunger by contacting the confronting wall surface 102 at the head of the plunger.

Figure 14:
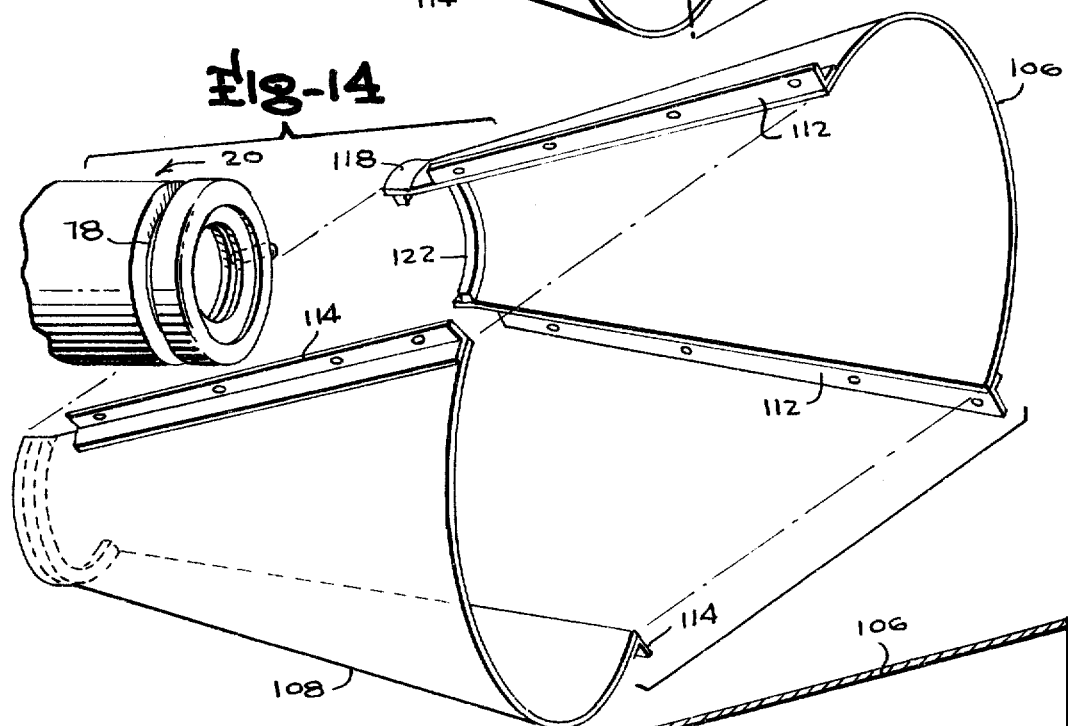
FIG. 14 has a disassembly view of the embodiment of FIG. 13.
Figure 15:
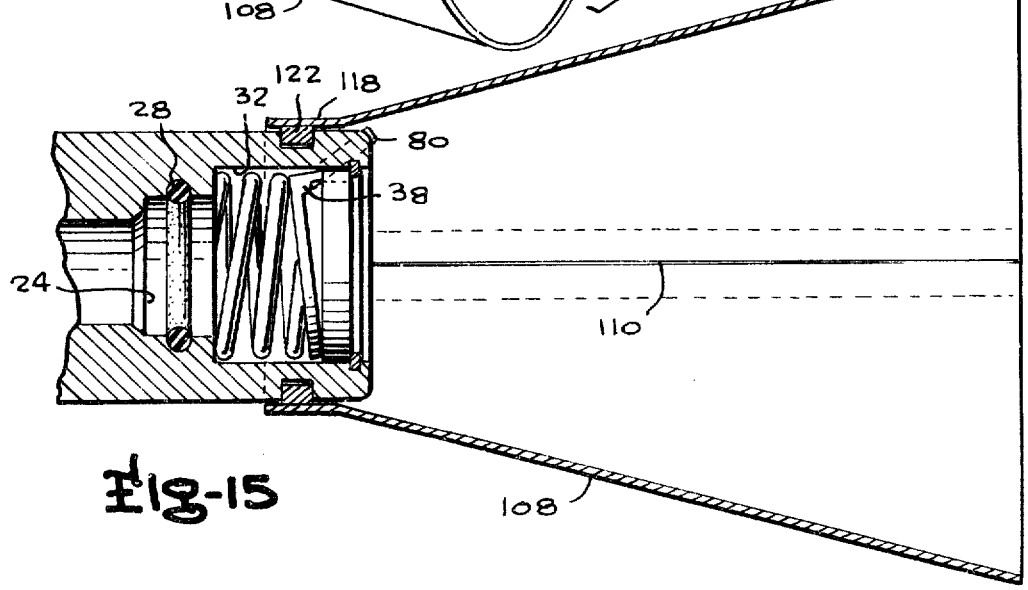
FIG. 15 is a cross-sectional view taken along the lines 15—15 of FIG. 13.

A further embodiment of the present invention is illustrated in FIGS. 13 through 15 and is used to align the releasable connector 20 over the end of a pipeline that may be gushing fluids such as an oil or gas pipeline in which the force of the fluids tend to prevent the proper alignment of the connector and also is used to narrow the gushing fluid area to flow through the connector.

As shown in FIGS. 13 through 15 the releasable connector 20 is provided with a funnel shaped skirt 104 in a form of a truncated cone. As shown the funnel is formed of mating halves 106 and 108 which are suitably secured at mating edges 110 by means of projecting flanges 112 and 114 connected to the respective half and bolted or otherwise releasably connected at 116.

At the narrow end 118 which has an inside diameter fitting the outside diameter of the releasable connector 20, there is provided a key or inwardly radially projected rim 122 which fits into the complementary groove or slot 78 on the external surface of the releasable connector 20. Once positioned upon the releasable connector the funnel may be guided over the wild oil or gas well so that it may be capped and controlled.

The releasable connector 20 as illustrated in FIGS. 13 through 15 is preferrably used with the jamming screw 80 as previously described. The jamming screw may be set against the locking ring 38 upon the removal of the funnel 104 after the releasable connector is in position upon the conduit. To release the releasable connector 20 from the conduit the screw 80 may be turned back and the release pin assembly as described in connection with the embodiment of FIGS. 1 through 4 may be utilized. The hook shape member 74 of the release pin assembly will engage the circumferential groove or slot 78 for direction of the pin 58 into contact with the locking ring for axially aligning this ring to effect disengagement.

The foregoing description should not be construed as limiting the invention, but as merely illustritive. The scope of the invention properly being limited by the following claims.

I claim:

1. A releasable connector for pipes, tubes and like conduits comprising:
   a. a housing having a central bore sized to receive said conduit,
      1. means positioned in said sized central bore for sealing said conduit to effect a watertight seal,
   b. an enlarged bore positioned adjacent the mouth of said central bore,
   c. a spring sized to fit within said enlarged bore and freely receive said conduit,
   d. a locking ring biased against said spring to a canted position for grasping and holding the outer surface of said conduit,
   e. canting means on the opposite side of said ring for canting said locking ring to hold said conduit in position,
   f. abutment means at one end of said enlarged bore to limit movement of said canting means,
   g. support means on the exterior of said housing to position a release pin for contact with said locking ring and to permit axial alignment of said locking ring with said conduit for release of said conduit,
   h. release pin actuating means pivotally and releasably connectable to said support means, and
   i. a release pin pivotally connected to said release pin actuating means to effect release of said conduit by substantially axial movement of said release pin.

2. The releasable connector of claim 1 including:
said support means being a boss protruding substantially radially from the surface of said housing.

3. The releasable connector of claim 1 including:
said support means being a groove around the outer circumference of said housing.

4. The releasable connector of claim 1 including:
said release pin actuating means includes a pivotally connected lever arm, and
projecting means secured to said lever arm for engagement with said support means to permit inward, substantially axial movement of said release pin.

5. The releasable connector of claim 4 including:
said projecting means being hook shaped.

6. The releasable connector of claim 1 including:
a ring washer positioned on the side of said locking ring opposite to said spring and including a hole for receiving said release pin for contact with said locking ring.

7. The releasable connector of claim 1 including:
said release pin actuating means includes a pivotally connected lever arm,
projecting means secured to said lever arm for engagement with said support means to permit inward, substantially axial movement of said release pin,
said projecting means being hook-shaped, and
a ring washer positioned on the side of said locking ring opposite to said spring and including a hole for receiving said release pin for contact with said locking ring.

8. The releasable connector of claim 1 including:
a retaining ring forming said abutment means.

9. The releasable connector of claim 1 including:
said canting means comprising on offset projection for contact with said abutment means.

10. The releasable connector of claim 9 including:
said offset projection being provided with an intermediate shoulder for abutting contact and an alignment finger to maintain a preselected relative position for said canting means.

11. The releasable connector of claim 10 including:
a ring washer positioned on the side of said locking ring opposite to said spring and including a hole for receiving said release pin for contact with said locking ring.

12. The releasable connector of claim 11 including:
said ring washer being provided with a complementary slot for receiving said alignment finger and being positioned on the opposite side from said release hole.

13. The releasable connector of claim 12 including:
said release pin actuating means includes a pivotally connected lever arm, and,
projecting means secured to said lever arm for engagement with said support means to permit inward, substantially axial movement of said release pin.

14. The releasable connector of claim 1 including:
screw means provided in said housing to effect canting of said locking ring, said screw means being angled obliquely downwardly to contact said locking ring, and
a ring washer positioned on the side of said locking ring opposite to said spring and including a hole for receiving said release pin for contact with said locking ring.

15. The releasable connector of claim 14 including:
said washer having a receiving portion for said screw.

16. The releasable connector of claim 15 including:
said receiving portion being a cut out to at least partially surround said screw.

17. The releasable connector of claim 1 including:
said housing at the opposite end from said enlarged bore being elongated and forming a telescopic chamber in fluid communication with said central bore,
a hollow plunger telescopically received within said chamber,
sealing means positioned on the head end of said plunger to form a leak tight seal with said chamber, and a second releasable connector as claimed in claim 1 positioned upon the opposite end of said plunger to form an extensible releasable connector to adjacent ends of a conduit.

* * * * *